United States Patent
Marinas Perez et al.

(10) Patent No.: US 9,593,021 B2
(45) Date of Patent: Mar. 14, 2017

(54) METHOD FOR PROCESSING FINELY DIVIDED SOLIDS DURING PRODUCTION OF CHLOROSILANES

(71) Applicants: Janaina Marinas Perez, Murg (DE); Ekkehard Mueh, Rheinfelden (DE); Hartwig Rauleder, Rheinfelden (DE); Frank Kropfgans, Rheinfelden (DE)

(72) Inventors: Janaina Marinas Perez, Murg (DE); Ekkehard Mueh, Rheinfelden (DE); Hartwig Rauleder, Rheinfelden (DE); Frank Kropfgans, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 30 days.

(21) Appl. No.: 14/649,353

(22) PCT Filed: Nov. 21, 2013

(86) PCT No.: PCT/EP2013/074376
§ 371 (c)(1),
(2) Date: Jun. 3, 2015

(87) PCT Pub. No.: WO2014/095220
PCT Pub. Date: Jun. 26, 2014

(65) Prior Publication Data
US 2015/0315030 A1    Nov. 5, 2015

(30) Foreign Application Priority Data

Dec. 21, 2012  (DE) .................. 10 2012 224 182

(51) Int. Cl.
| | | |
|---|---|---|
| C01B 33/107 | (2006.01) | |
| C01B 33/00 | (2006.01) | |
| C08K 11/00 | (2006.01) | |

(52) U.S. Cl.
CPC ............ *C01B 33/00* (2013.01); *C01B 33/107* (2013.01); *C01B 33/10742* (2013.01); *C08K 11/005* (2013.01)

(58) Field of Classification Search
None
See application file for complete search history.

(56) References Cited

U.S. PATENT DOCUMENTS

| | | |
|---|---|---|
| 4,892,694 A | 1/1990 | Ritzer et al. |
| 5,126,203 A | 6/1992 | Ritzer et al. |

(Continued)

FOREIGN PATENT DOCUMENTS

| | | |
|---|---|---|
| CN | 1205266 A | 1/1999 |
| CN | 102686514 A | 9/2012 |

(Continued)

OTHER PUBLICATIONS

Chemical Engineers' Handbook, 5th edition, Perry and Chilton, 1973, pp. 8-58 to 8-59.*

(Continued)

*Primary Examiner* — Mary F Theisen
(74) *Attorney, Agent, or Firm* — Oblon, McClelland, Maier & Neustadt, L.L.P.

(57) ABSTRACT

The invention provides a method for the processing of finely divided solids during the production of chlorosilanes, which is characterized in that the finely divided solids are hydraulically pressed to give bodies of increased density. Moreover, also provided is the compact obtained by the process according to the invention which is characterized by a filling factor of the finely divided solids to be hydraulically pressed of 3.9 to 4.5.

14 Claims, 1 Drawing Sheet

Density and filling factor as a function of the pressing pressure

(56) References Cited

U.S. PATENT DOCUMENTS

2012/0261269 A1    10/2012    Kagohashi et al.
2013/0319391 A1    12/2013    Hariharan et al.

FOREIGN PATENT DOCUMENTS

| | | |
|---|---|---|
| DE | 10 2009 020 143 A1 | 11/2010 |
| EP | 0 287 934 A2 | 10/1988 |
| EP | 0 287 934 A3 | 10/1988 |
| JP | 63-310690 A | 12/1988 |
| JP | 2-14882 A | 1/1990 |
| JP | 2010-53011 A | 3/2010 |
| JP | 2012-17247 A | 1/2012 |
| WO | WO 2012/109459 A1 | 8/2012 |
| WO | WO 2014/095221 A1 | 6/2014 |

OTHER PUBLICATIONS

Combined Chinese Office Action and Search Report issued Mar. 1, 2016 in Patent Application No. 201380066528.2 (submitting English translation only).

Yong Liu, et al., "Influence of Powder Materials on Pressing Molding" Advanced Ceramics, No. 4, Dec. 31, 2003, pp. 35-38 (submitting English Abstract and partial English translation only).

International Search Report issued Apr. 3, 2014, in PCT/EP2013/074376, filed Nov. 21, 2013.

Office Action issued on Jul. 11, 2016 in Japanese Patent Application No. 2015-548310 (with English lanquage translation).

\* cited by examiner

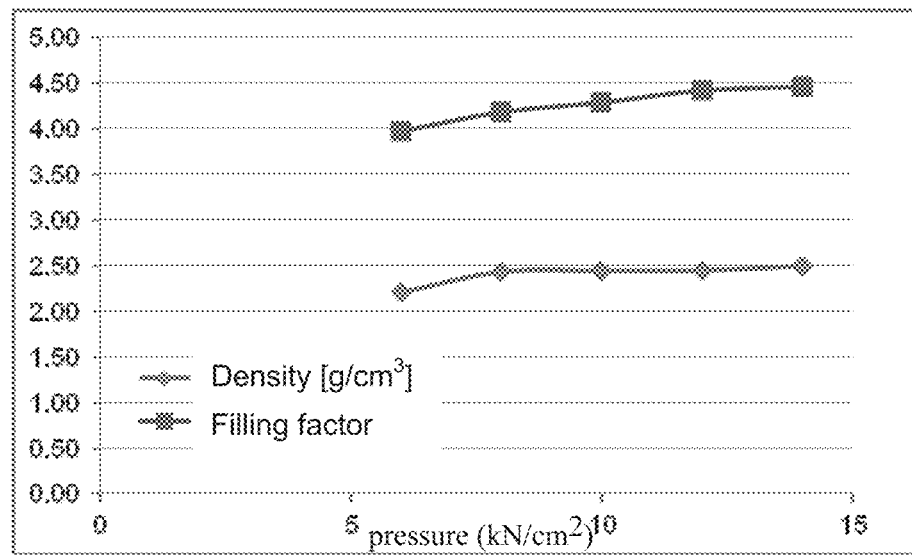
Density and filling factor as a function of the pressing pressure

METHOD FOR PROCESSING FINELY DIVIDED SOLIDS DURING PRODUCTION OF CHLOROSILANES

The invention relates to a process for the processing of finely divided solids which are produced during the production of chlorosilanes by hydraulic pressing, and also to the compact obtained according to the process.

Chlorosilanes such as silicon tetrachloride ($SiCl_4$, abbreviated to STC), trichlorosilane ($HSiCl_3$, abbreviated to TCS) and dichlorosilane ($H_2SiCl_2$) are an important class of substance with a broad field of application. They are thus used as raw material for producing $SiO_2$, so-called fumed silica, as starting material for organosilanes and silicic acid esters, and also as starting materials for optical waveguides and semi-conductor and solar silicon.

It is therefore of the highest technical and economical importance to be able to cost-effectively and safely produce chlorosilanes in a large amount.

Silicon (Si) and hydrogen chloride (HCl) and/or chlorine (Cl) are reacted in a reactor, e.g. fluidized-bed reactor or fixed-bed reactor or stirred-bed reactor, as a result of which inorganic chlorosilanes such as $SiCl_4$ and/or $HSiCl_3$ and/or $H_2SiCl_2$ or mixtures thereof are formed and leave the reactor as product gases and are then further treated.

As a result of production, the product gases contain solids such as, for example, powders and/or dust containing silicon, iron, iron chloride and/or aluminum chloride. For example, iron chloride and aluminum chloride are reaction by-products which originate from the fact that the crude silicon used contains these metals in small amounts as contaminations which, following liquefaction of the product gases, the so-called vapors, are left behind in the liquid phase and settle in the container for the liquid phase. As a result, they can be separated off from the chlorosilane mixture formed.

The aforementioned solids are also retained in a reactor for the chlorosilane production. Particularly in the case of the fluidized-bed process for producing trichlorosilane and silicon tetrachloride, these solids arise in the form of powder, dust, for example filter dust, and/or ash, for example hot gas filter ash. For the purposes of the invention, such solids are summarized under the term "finely divided solids".

The finely divided solids have primarily silicon and iron, and can moreover contain chlorine compounds. Together with the chlorine compounds, which are gaseous reaction products under the reaction conditions, for example TCS and STC, the finely divided solids are conveyed from the reactor.

In the case of the fluidized-bed process, ground metallurgical silicon with a diameter of about 500 μm is reacted with hydrogen chloride. During the course of the reaction, the silicon particles become smaller and smaller and can ultimately leave the reactor as dusts. These dusts are usually separated off by means of filters or cyclones before the reaction products TCS and STC are condensed. Since they are very fine and also contain a large fraction of silicon besides iron, they are a valuable raw material.

Further silicon-containing solids are produced during the production of silicon from monosilane by deposition processes. Such solids are often mixtures of coarse product fractions, which are separated off from the process via sieves, are likewise analysis residues and not goods which meet the specification. The silicon fraction is often more than 99%.

The patent specification DE 10 2009 037 155 B3 envisages reacting the dusts discharged from the fluidized bed in a second attached fluidized-bed reactor. This process has the disadvantage that the majority of the solid is also discharged from the second reactor on account of its extreme finely divided nature without being materially reacted.

DE 10 2009 020 143 A1 discloses a process for working up sawing wastes from wafer production. In this case, sawing wastes containing silicon and organic compounds are granulated on a granulating plate and are thus supposedly prepared for further use in the chlorosilane production. The sawing slurries from which these Si-containing sawing cuttings or dusts are separated off are produced as filtercakes or suspensions of these wastes in silicone oils or polyethylene glycols. However, the separation of the individual components is complex, and the high fraction of organic compounds alongside silicon in this stream leads to the formation of numerous undesired by-products in the chlorosilane reactors. Moreover, the granules produced from the crystalline material are not very mechanically stable and rapidly crumble again.

A further option of combining the aforementioned solids again to give larger aggregates or pieces consists in melting or sintering them. However, on account of the high melting temperatures, the required energy expenditure is disadvantageous.

It was therefore the object to modify the finely divided solids in such a way that they can be returned to the chlorosilane production process again.

The object is achieved by a process for processing the finely divided solids and by the compacts obtained according to this process.

The invention provides a process for the processing of finely divided solids during the production of chlorosilanes, which is characterized in that the finely divided solids are hydraulically pressed to give bodies of increased density. The procedure of hydraulically pressing the finely divided solids is, for the purposes of the invention, synonymous with the fact that the finely divided solids are pressed in a hydraulic press. Devices which function according to the principle of hydraulic pressing are known to the person skilled in the art.

The advantage of the claimed process is moreover considered to be that, after the implementation, compacts are obtained which can be returned to the production process of chlorosilanes in a simpler manner without, as is otherwise customary, having to handle the extremely dusty powder. For example, the compacts obtained according to the invention can be handled by means of conveyor belts or containers and be returned to the chlorosilane production process. An exclusion of air, which prevents a hazardous fluidization of finely divided solids, or a complex removal by suction using filter devices is superfluous with the implementation of the process according to the invention.

BRIEF DESCRIPTION OF THE DRAWING

FIG. 1 shows the change of the density and the filling factor of the obtained compact with the pressing pressure.

The invention is illustrated in more detail below.

In the process according to the invention, it can be advantageous to use a cylindrical sheath made of ceramic, preferably of high-strength silicon nitride ceramic, as pressing vacancy. Here, the upper and lower punch of the hydraulic press can be selected from hardened steel. Preferably, punches can be used in cylindrical form, although any other form is also possible, for example angular punches, which produce cube- or square-shaped compacts, or semispherical shapes.

Since the finely divided solids contain chlorine compounds, the compacts have hydrochloric acid on their surface upon contact with water or atmospheric moisture, and said acid corrodes both inadequately alloyed steel as well as unpainted constituents of the hydraulic press. Consequently, the use of a ceramic sheath made of silicon nitride, $Si_3N_4$, as pressing vacancy is advantageous.

Hydrogen chloride likewise attacks mucosa, skin and eyes of people. Consequently, it must be strictly observed that in the event of carrying out the process manually, personal protective equipment is worn which prevents direct contact between the finely divided solids used and the compacts obtained according to the invention and skin, eyes and mucosa.

Preferably, inorganic binders, preferably silicas, aluminates, zirconates, calcium oxide, calcium hydroxide, cement, calcium sulfate, binders containing organic compounds, for example silicic acid esters, or a mixture of these binders can be used. If organic binders are used, the organic fraction has to be removed in a calcination step prior to use for the chlorosilane production. The use of a binder or of a mixture of aforementioned binders has the advantage of an alkaline pH. This is because the solids from the chlorosilane synthesis contain HCl and hydrolyzable silicon-halogen bonds on account of the prevailing reaction conditions in the chlorosilane production process, and these adhere to the solids which thus have an acidic pH. This is neutralized by the binder or binders. The unpleasant property of the compacts of releasing hydrogen chloride can thus be at least partially overcome.

It may be advantageous to use a pressing pressure in the process according to the invention which is at most 14 $kN/cm^2$, preferably from 10 $kN/cm^2$ to 12 $kN/cm^2$.

In the context of the invention, pressure and pressing pressure are understood as meaning the superatmospheric pressure above the ambient pressure of 1013 hPa at 20° C. which is exerted upon the finely divided solids in the hydraulic press. At a pressing pressure of zero, just the ambient pressure is thus exerted and therefore no compaction is achieved.

At a pressing pressure of at most 14 $kN/cm^2$, surprisingly stable compacts are obtained since these can be handled, for example conveyed into a reactor for the production of chlorosilanes by a conveyor belt, without crumbling or breaking into lumps.

If the pressing pressure is selected from the interval from 10 $kN/cm^2$ to 12 $kN/cm^2$, those compacts obtained according to the invention even withstand a drop from a height of up to 2 m without breaking. This is because these compacts do not have an inhomogeneous density distribution synonymous with the fact that the compacts do not have zones with increased density gradients, so-called layers. The layers can be expanded crossways, longitudinally or in any other direction within the volume of the compact and based on the direction of action of the pressing pressure and have a fleece or lens-like configuration. The formation of such layers, the so-called layer formation, arises to a particularly increased extent above a pressing pressure of 14 $kN/cm^2$. If the layer formation is avoided, the compacts can be returned to the reactor in a particularly simple manner.

In a further embodiment of the process according to the invention, the pressing pressure can be applied by initiating the pressure starting at zero with a selected pressing rate. In the context of the invention, the pressing rate is the quotient of pressing pressure and the duration during which the pressure is increased to the pressing pressure with monotonic increase, synonymous with the fact that the pressing pressure is initiated during this period.

Preferably, in the process according to the invention, the pressing pressure can be initiated with a pressing rate from 0.1 to 1 $kN/cm^2 s$, preferably of 0.5 $kN/cm^2 s$, until the pressing pressure is achieved, and then held for a period from 0.5 to 1.5 s, preferably of 1 s, and then reduced to zero over a period from 0.5 to 1.5 s, preferably of 1 s.

In the process according to the invention, at least one deaeration stroke is particularly preferably carried out, in which case each deaeration stroke is characterized in that at at least one initial pressure $p_{1i}$, which is at most as great as the pressing pressure, this pressure is reduced over a period $\Delta_1$ from 0.5 to 1.5 s, preferably of 1 s, to a value $p_{1f}$, preferably to $p_{1f}=0$, and $p_{1f}$ is for a period $\delta_1$ held from 0 to 1 s, preferably for 0 s, and then the pressure is initiated until the pressing pressure is reached.

Preferably, the initial pressure is selected to be less than the pressing pressure. This is because it has been found that upon filling a pressing vacancy with the finely divided solids before initiating the pressure, the pressing vacancy contains up to 77% by volume air or gas. Upon initiating the pressure, the density of the finely divided solids is gradually increased, and the air or the incorporated gas has to escape. The smaller the sizes of the particles of the finely divided solids, the longer it takes until incorporated air or gas has escaped. If at least one deaeration stroke is carried out in the process according to the invention, compacts are obtained which have greater strength than without at least one deaeration stroke.

Particularly solid compacts are obtainable if in the process according to the invention two deaeration strokes a and b are carried out, and a at an initial pressure $p_{1a}$, with the periods $\Delta_{1a}$ and $\delta_{1a}$, b at an initial pressure $p_{1b}$, with the periods $\Delta_{1b}$ and $\delta_{1b}$, and $p_{1a}$ and $p_{1b}$ are identical or different, preferably different, and the periods $\Delta_{1a}$ and $\Delta_{1b}$ are identical or different, preferably different, and the periods $\delta_{1a}$ and $\delta_{1b}$ are identical or different, preferably different.

Each deaeration stroke can be carried out with or without vacuum, preferably without vacuum, and be initiated with 0.2 to 1 $kN/cm^2$, preferably 0.5 $kN/cm^2$ pressing pressure, and for 2 to 10 s, preferably 5 s duration.

Furthermore, it can be advantageous to eject the compact from the pressing vacancy in the process according to the invention with an ejection force of 7 to 8 $kN/cm^2$. The ejection force has to be applied in order to drive the compact from the vacancy. It is known to the person skilled in the art from the field of hydraulic pressing. Unusually for the outcome of hydraulic pressing, however, no noises arise upon ejection.

There is thus no jerky force pattern upon ejection of the compact from the vacancy which one would expect in the prior art on account of the significantly greater static friction compared with the sliding friction. The known Slip-Stick effect is surprisingly not present when carrying out the claimed process.

After carrying out the process according to the invention, a surprisingly high filling factor is found. In the context of the invention, a filling factor is understood as meaning the ratio of the height with which the pressing vacancy is filled with the finely divided solids to the height of the compact produced according to the invention. If, for example, the vacancy has been filled to a height of 96 mm, and, after the process according to the invention has been carried out, a compact with a height of about 22 mm is obtained, this compact is present with a filling factor of

96/22=4.36.

This filling factor is unexpectedly high compared with filling factors of customary pressing masses, for example of standard commercial sands, of ceramic granules for the sintering for producing tiles. For example, in the case of pure sand and the same pressing pressure, it is lower by about a factor of 2.

Consequently, the invention likewise provides a compact which is obtained according to the claimed process and which is characterized by a filling factor of the finely divided solids to be hydraulically pressed of 3.9 to 4.5.

The process according to the invention will be illustrated in more detail below by reference to examples.
Pressing Experiments on Finely Divided Solids from the Chlorosilane Production.

In the examples described hereinbelow, the finely divided solids were filter dust from the hot filter of a fluidized-bed reactor for the production of chlorosilanes, so-called hot gas filter ash.

A hydraulic press of the Alpha 1500_120 type from Alpha Ceramics was implemented. Here, a cylindrical DM 41 mm 4-hole cylinder mold without conical opening was used. Its upper and lower punches consisted of hardened steel, and the pressing vacancies used were sheaths made of high-strength silicon nitride ceramic ($Si_3N_4$). Here, it was ensured that the mold surface was drawn off cleanly. If this cannot be effected, it is also possible to press from above using a mirror plate. However, cakings of the compact on the contact surfaces can then be expected.

In the experiments, upper punches were driven to enter into the mold. For this, these upper punches were aligned.

On account of the very fine ash, a circulating punch play of at most 0.05 mm was traveled, and also a targeted removal by suction between the lower punches was used since, during the initiation of the pressure, a blowing-out of material along the lower punches was observed.

Each pressing vacancy was filled up to a height of 96 mm with the hot gas filter ash. The experiments differ as a result of the pressing force, which was 6, 8, 10, 12 or 14 kN/cm$^2$ and had been initiated in each case at a pressing rate of 0.5 kN/cm$^2$s.

The ejection force was in each case 7.5 kN/cm$^2$.

The extent and the densities of the compacts obtained according to the invention are summarized in table 1.

TABLE 1

Overview of the ascertained parameters of the compacts as a function of the pressing pressure.

| Pressing pressure kN/cm$^2$ | Compact | | | | |
|---|---|---|---|---|---|
| | Diameter [mm] | Height [mm] | Weight [g] | Density [g/cm$^3$] | Filling factor |
| 6 | 41.25 | 24.18 | 71.17 | 2.20 | 3.97 |
| 8 | 41.26 | 22.95 | 74.63 | 2.43 | 4.18 |
| 10 | 41.17 | 22.39 | 72.70 | 2.44 | 4.29 |
| 12 | 41.18 | 21.72 | 70.65 | 2.44 | 4.42 |
| 14 | 41.16 | 21.52 | 71.37 | 2.49 | 4.46 |

For each experiment which has been carried out with the pressing pressure noted in table 1, two deaeration strokes were used.

The first deaeration stroke at 2 kN/cm$^2$ pressure was initiated with 0.5 kN/cm$^2$s for 4 s, not held, and decreased within 1 s.

The second deaeration stroke was initiated at 4 kN/cm$^2$ pressure with 0.5 kN/cm$^2$s for 8 s, held for 1 s and decreased within 1 s.

It was found that the hot gas filter ash cannot be compacted much more than was achieved with a pressing pressure of 14 kN/cm$^2$. Instead, it was observed that density and filling factor as a function of the pressing pressure exhibited a saturation behavior, shown in FIG. 1. Use of higher pressing pressures, not shown here, resulted in layer formation in the compacts.

In the case of a pressing pressure 10 kN/cm$^2$ to 12 kN/cm$^2$, the compacts obtained according to the invention withstood a drop from a height of about 2 m without breaking open. Consequently, these have a sufficiently good stability to be able to be returned to the reactor.

The invention claimed is:

1. A process for processing finely divided solids during production of chlorosilanes, the process comprising
hydraulically pressing the finely divided solids to obtain at least one compact of increased density by applying a pressing pressure initiated at zero at a pressing rate of from 0.1 to 1 kN/cm$^2$s until a final pressing pressure of at most 14 kN/cm$^2$ is reached,
then holding the final pressing pressure for a period of from 0.5 to 1.5 s, and
subsequently reducing the pressing pressure to zero over a period of from 0.5 to 1.5 s.

2. The process as claimed in claim 1, wherein said pressing occurs in a pressing vacancy which is a cylindrical sheath comprising ceramic.

3. The process as claimed in claim 2, further comprising ejecting the compact from the pressing vacancy with an ejection force of 7 to 8 kN.

4. The process as claimed in claim 2, wherein the pressing vacancy is a cylindrical sheath comprising high-strength silicon nitride ceramic.

5. The process as claimed in claim 1, further comprising carrying out at least one deaeration stroke,
wherein for each deaeration stroke,
an initial pressure $p_{1i}$, which is at most as great as the pressing pressure, is reduced over a period $\Delta_1$ from 0.5 to 1.5 s, to a value $p_{1f}$,
$p_{1f}$ is held for a period $\delta_1$ from 0 to 1 s, and then
the pressing pressure is initiated until the final pressing pressure is reached.

6. The process as claimed in claim 5, wherein
two deaeration strokes a and b are carried out, and
a is carried out at an initial pressure $p_{1a}$, with the periods $\Delta_{1a}$ and $\delta_{1a}$,
b is carried out at an initial pressure $p_{1b}$, with the periods $\Delta_{1b}$ and $\delta_{1b}$,
$p_{1a}$ and $p_{1b}$ are identical or different,
the periods $\Delta_{1a}$ and $\Delta_{1b}$ are identical or different, and
the periods $\delta_{1a}$ and $\delta_{1b}$ are identical or different.

7. The process as claimed in claim 5,
wherein for each deaeration stroke,
the period $\Delta_1$ is 1 s, $p_{1f}=0$, and $p_{1f}$ is held for a period $\delta_1$ of 0 s.

8. The process as claimed in claim 5, wherein
two deaeration strokes a and b are carried out, and
a is carried out at an initial pressure $p_{1a}$, with the periods $\Delta_{1a}$ and $\delta_{1a}$,
b is carried out at an initial pressure $p_{1b}$, with the periods $\Delta_{1b}$ and $\delta_{1b}$,
$p_{1a}$ and $p_{1b}$ are different,
the periods $\Delta_{1a}$ and $\Delta_{1b}$ are different, and
the periods $\delta_{1a}$ and $\delta_{1b}$ are different.

9. The process as claimed in claim 5, wherein each deaeration stroke is carried out with vacuum.

10. The process as claimed in claim 5, wherein each deaeration stroke is carried out without vacuum.

11. The process as claimed in claim 5, wherein the initial pressure $p_{1i}$ for each deaeration stroke ranges from 0.2 to 1 kN/cm².

12. The process as claimed in claim 1, where the final pressing pressure is from 10 kN/cm² to 12 kN/cm².

13. The process as claimed in claim 1, wherein the pressing rate during said hydraulically pressing is from 0.1 to 0.5 kN/cm²s, the final pressing pressure is held for a period of 1 s, and said reducing is carried out over a period of 1 s.

14. A compact, obtained according to the process as claimed in claim 1, wherein a filling factor of the finely divided solids to be hydraulically pressed is from 3.9 to 4.5.

* * * * *